US006221132B1

(12) United States Patent
Dong et al.

(10) Patent No.: US 6,221,132 B1
(45) Date of Patent: Apr. 24, 2001

(54) VACUUM PREPARATION OF HYDROGEN HALIDE DRIER

(75) Inventors: Chun Christine Dong, Macungie; Alexander Schwarz, Bethlehem; Dean V. Roth, Center Valley; Delbert D. Christman, Kempton, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/417,668

(22) Filed: Oct. 14, 1999

(51) Int. Cl.[7] .................................................. B01D 53/28
(52) U.S. Cl. ............................ 95/117; 95/901; 423/488
(58) Field of Search .................... 95/117, 901; 423/210, 423/488

(56) References Cited

U.S. PATENT DOCUMENTS

| 2,196,246 | | 4/1940 | Brown et al. ......................... 423/488 |
| 4,695,487 | | 9/1987 | Cho ..................................... 427/294 |
| 4,707,299 | | 11/1987 | Block ................................. 252/400.1 |
| 4,832,935 | * | 5/1989 | Lester et al. ...................... 423/488 X |
| 4,840,637 | | 6/1989 | Rolffs ..................................... 8/402 |
| 4,853,148 | | 8/1989 | Tom et al. ............................ 252/194 |
| 4,867,960 | * | 9/1989 | Tom ..................................... 423/488 |
| 4,925,646 | | 5/1990 | Tom et al. ............................ 423/488 |
| 4,959,076 | | 9/1990 | Rolffs ..................................... 8/402 |
| 5,202,106 | | 4/1993 | Vanlautem .......................... 423/488 |
| 5,322,674 | * | 6/1994 | Mori ................................ 423/488 X |
| 5,539,998 | | 7/1996 | Mostowy et al. ...................... 34/343 |
| 5,597,545 | * | 1/1997 | Chang et al. .................... 423/488 X |
| 5,766,565 | | 6/1998 | Cronin et al. ........................ 423/488 |
| 5,827,492 | * | 10/1998 | Corbin et al. ........................ 423/488 |
| 5,910,292 | * | 6/1999 | Alvarez, Jr. et al. .............. 95/117 X |
| 5,958,356 | | 9/1999 | Dong et al. .......................... 423/488 |

FOREIGN PATENT DOCUMENTS

| 215064 | 10/1984 | (DE) . |
| 236912 | 6/1986 | (DE) . |
| 2188043 | 9/1987 | (GB) . |
| 61-101244 | 5/1986 | (JP) . |
| 513695 | 2/1993 | (JP) . |
| 1726368 | 4/1992 | (SU) . |

* cited by examiner

Primary Examiner—Robert H. Spitzer
(74) Attorney, Agent, or Firm—Geoffrey L. Chase

(57) ABSTRACT

An adsorbent and method for making it and its use in removing water from gaseous hydrogen halide. Magnesium halide supported on an activated carbon prepared under vacuum will remove water at 1 to 500 ppm.

19 Claims, 2 Drawing Sheets

VACUUM PREPARATION OF HYDROGEN HALIDE DRIER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention pertains to removal of moisture or water vapor from gaseous hydrogen chloride (HCl).

Gaseous hydrogen chloride is one of the key specialty gases used in the manufacture of semi-conductor devices. HCl is used to grow silicon crystals (epitaxy) and is also used to etch silicon wafers in a dry etching process. For both of these applications high purity HCl is required. High purity HCl is generally taken to mean HCl free of water, or containing less than 0.5 ppm of water.

HCl containing water is highly corrosive and will present problems to the gas delivery system as well as adversely affecting production yields during the manufacture of semi-conductor devices.

For example water contained in hydrogen chloride gas will necessitate frequent replacement of piping, manifolds, valves and the like which are used to deliver the hydrogen chloride to the point of use in the semi-conductor manufacturing process. In cleaning susceptors which are the support structure on which wafers are processed, water contained in gaseous hydrogen chloride will result in a formation of a new oxide on the susceptor thus, preventing the cleaning function of the hydrogen chloride. In etching applications, water contained in the hydrogen chloride becomes a source of undesirable contamination in a semi-conductor manufacturing environment, which may render chip products made in this environment less than efficient or totally useless for their intended purpose.

U.S. Pat. Nos. 4,853,148 and 4,925,646 disclose a number of adsorptive compositions and methods for removing water from HCl. Among the materials and processes suggested is adsorption using magnesium chloride ($MgCl_2$) supported on an alumina ($Al_2O_3$) substrate. However, it has been found that the use of $MgCl_2$ on $Al_2O_3$ for moisture removal from hydrogen chloride results in hydrogen chloride slowly reacting with the $Al_2O_3$ support to produce a volatile product, $AlCl_3$. The $AlCl_3$ will solidify at cool spots in the downstream process equipment resulting in deposits on the process equipment, such as regulators, filters and valves. This in turn causes system maintenance problems and eventually contamination of the HCl product.

Japanese Patent Application H5-13695 discloses removal of water from gaseous hydrogen chloride using a synthetic mordenite. However, it was found that the synthetic mordenite is not stable in gaseous hydrogen chloride.

Russian Patent 1726368 discloses removing water and oxygen from hydrogen chloride gas using iron chloride ($FeCl_2$) supported on a carbon substrate.

Prior art workers have also used silica gel to remove water from gaseous hydrogen chloride. However, although silica gel and $FeCl_2$ on carbon are stable in hydrogen chloride their water adsorption capacities are relatively low so that these materials must be changed more frequently when used in a HCl purification system.

Vacuum impregnation techniques are known in the prior art for some other applications, such as: 1) treating wood to change its color, U.S. Pat. No. 4,959,076 and U.S. Pat. No. 4,840,637, 2) making a carbon-metal phosphate composite, U.S. Pat. No. 4,707,299, and 3) coloring granite, U.S. Pat. No. 4,695,487.

For making an adsorbent, however, a different vacuum impregnation technique was applied in the prior art, which includes: 1) depositing iron (III) chloride on activated carbon for adsorption of hydrogen sulphide, DD Patent 236,912 A1 and 2) impregnating an aqueous solution of an alkali salt of N-methylalanine into a porous support for adsorption of carbon dioxide, JP Patent 61-101244 A. In both of these two patents, the term "vacuum impregnation" used the technique of immersing a porous carrier in an aqueous solution under a reduced pressure.

Additional prior art of general interest include; U.S. Pat. No. 2,196,246; U.S. Pat. No. 5,202,106; U.S. Pat. No. 5,539,998; U.S. Pat. No. 5,766,565; DD Patent No. 215,064 and GB Pat. No. 2,188,043.

The prior art has suggested various materials and techniques for impregnating adsorbents and water sorptive materials on supports. In some instances, vacuum has been used for adsorbents for other than water sorption. The vacuum is used for degassing during impregnation. However, the problem still exists to produce an effective water sorptive material to remove water from potentially corrosive gases such as HCl where the water sorptive material is stable in the presence of wet HCl and sufficient loading of the reagent forming the water sorptive material is achieved on a stable support. The present invention unexpectedly achieves these goals and overcomes this long term problem in the industry by the use of effective water sorptive material reagent on a stable support using a vacuum impregnation technique as will be described below.

BRIEF SUMMARY OF THE INVENTION

The present invention is a method of removing water from gaseous hydrogen halide, selected from the group consisting of HCl, HF, HBr, HI and mixtures thereof, wherein the water contained in the hydrogen halide is between 1 to 500 ppm by volume, by passing a hydrogen halide stream containing water over an adsorbent comprising between 5 to 35% by weight magnesium halide, wherein the halide is the halide of the gaseous hydrogen halide, supported on an activated carbon substrate prepared by the steps comprising:

subjecting an activated carbon substrate to vacuum conditions;

depositing from 5 to 35% by weight magnesium halide on the activated carbon substrate under the vacuum conditions to create the adsorbent;

drying the magnesium halide supported on activated carbon; and activating the adsorbent by heating to a temperature of from 270° C. (518° F.) to 400° C. (752° F.).

Preferably, the hydrogen halide is HCl and the magnesium halide is $MgCl_2$.

Preferably, the activated carbon substrate is dried prior to depositing the $MgCl_2$.

Preferably, 10–20% by weight $MgCl_2$ is present on the activated carbon.

Preferably, the vacuum is at least $10^{-3}$ torr.

Preferably, the substrate has a surface area of 300 to 2500 $m^2/g$.

The present invention is also an adsorbent for removal of moisture from gaseous HCl comprising $MgCl_2$ on an activated carbon substrate wherein the $MgCl_2$ is impregnated on the activated carbon substrate by providing the activated carbon substrate under vacuum conditions and contacting the activated carbon substrate with a solution of $MgCl_2$.

The present invention is further a method of preparing an adsorbent for removal of water from gaseous hydrogen halide selected from the group consisting of HCl, HF, HBr, Hl and mixtures thereof, comprising the steps of:

subjecting an activated carbon substrate to vacuum conditions;

depositing from 5 to 35% by weight magnesium halide, wherein the halide is the halide of the gaseous hydrogen halide, on the activated carbon substrate under the vacuum conditions to create the adsorbent;

drying the magnesium halide supported on activated carbon; and activating the adsorbent by heating to a temperature of from 270° C. (518° F.) to 400° C. (752° F.).

DETAILED DESCRIPTION OF THE INVENTION

Figure 1:
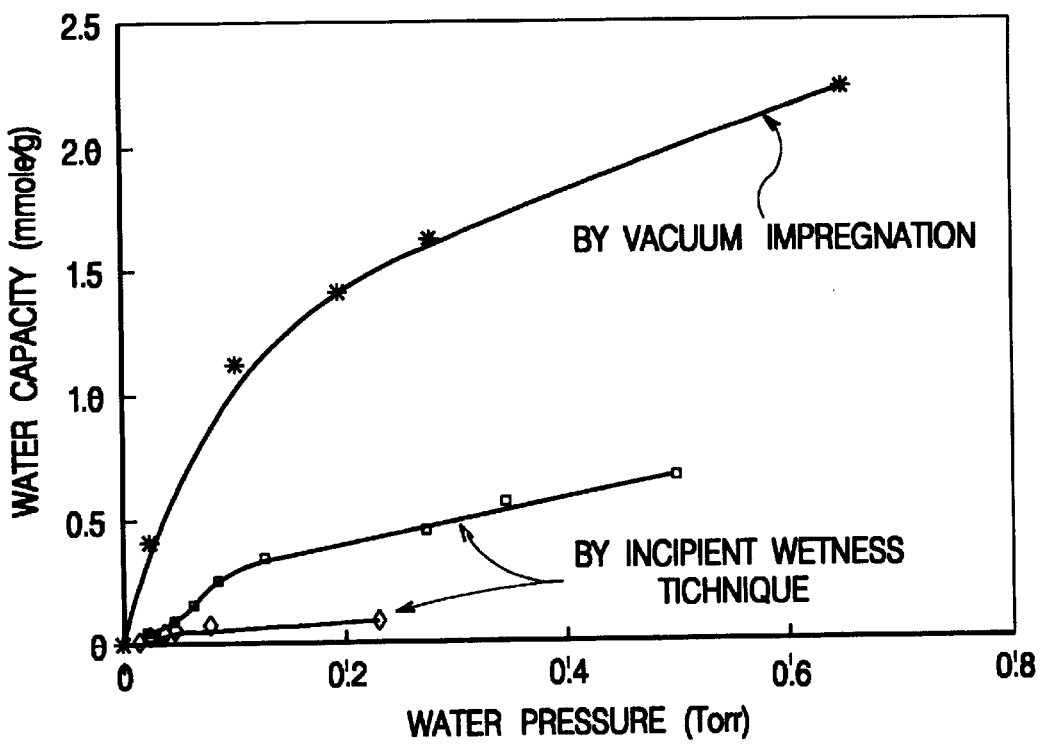
FIG. 1 is a plot of water capacity against water partial pressure for selected magnesium chloride on carbon deposition techniques of the present invention's vacuum impregnation technique and the incipient wetness technique.

In order to utilize hydrogen halides, such as hydrogen chloride gas, in the manufacture of electronic devices, it is essential that the hydrogen halide contain low amounts of retained water vapor or moisture, i.e. less than 0.5 ppm water.

To achieve this goal, the present invention uses the extremely effective combination of magnesium halide, such as a $MgCl_2$ water getter, an activated carbon substrate which is resistant to exposure to hydrogen halides, and vacuum impregnation which opens cleans the pores of the substrate and impregnates the most getter material into the pores of the support. The halide of the magnesium halide preferably is the halide of the hydrogen halide being dried.

The most distinguished feature of the present invention's adsorbent is that the material possesses the following four major criteria of being an idea adsorbent for moisture removal from a gaseous hydrogen halide: (1) a high stability in gaseous hydrogen halide, (2) a high water adsorption capacity under exposure to the gas stream to be purified, (3) a high drying efficiency for gaseous hydrogen halides, and (4) non-contamination of the purified product.

Currently manufacturers are using $MgCl_2$ on an $Al_2O_3$ support, synthetic mordenite, silica gel, and $FeCl_2$ on activated carbon to try and obtain gaseous hydrogen chloride with low water content. It has been discovered that both the $MgCl_2$ on an $Al_2O_3$ material support and mordenite are not stable in HCl. HCl can react with the $Al_2O_3$ (also present in mordenite) to form volatile $AlCl_3$, which will deposit on downstream components of the process equipment and cause operational problems for the semi-conductor manufacturer. Although silica gel and $FeCl_2$ on carbon are stable in an HCl environment found in semi-conductor manufacturing processes, the water adsorption capacities are relatively low so that a more frequent change of the purifier material is necessary.

According to the present invention adsorbents that are effective to remove water to the desired level from hydrogen halide gas must be contained on a support that will be resistant to attack by the hydrogen halide and be capable of supporting a metal chloride.

A number of materials were screened for use as a substrate by testing in a liquid HCl solution and pure water. Each candidate was tested by dropping a sample in a solution of 38% HCl in water and a bath of pure water in order to distinguish reactions caused by HCl from reactions caused by water. The HCl solution and water bath with the samples were maintained at 25° C. for 24 hours to observe if there was a color change, break or dissolution. Table 1 summarizes the results of the screening.

TABLE 1

| Material | Stability in 38% HCl solution | Stability in $H_2O$ | Screening |
| --- | --- | --- | --- |
| silicalite | stable | stable | pass |
| mordenite | not stable | stable | fail |
| silica gel | not stable | not stable | pass |
| 3A $CMS^1$ | stable | stable | pass |
| calcium chabazite | not stable | stable | fail |
| 3A zeolite | not stable | stable | fail |
| 4A zeolite | not stable | stable | fail |
| $K_2CO_3$ on $Al_2O_3$ | not stable | stable | fail |
| CaO | not stable | relative stable | fail |
| Potassium X zeolite | not stable | stable | fail |
| Alcoa $Selexsorb^2$ | not stable | stable | fail |
| $ZSM-5^2$ | not stable | stable | fail |
| $AW-500^3$ | not stable | stable | fail |

[1]Carbon Molecular sieve
[2]Zeolite
[3]Alumina silicate

The silicalite, silica gel, and carbon molecular sieve samples were all judged to be acceptable for supporting the magnesium halide, preferably $MgCl_2$, even though the silica gel by itself was not stable in either the 38% HCl solution or pure water over the test period. The instability of the silica gel is caused by the swelling effect of the material in the presence of water and not caused by reaction with HCl.

A composition was prepared by depositing $MgCl_2$ on activated carbon. The solid support was selected to have a high surface area. In the context of the present invention the surface area should broadly be within the range of 300 to 2500 $m^2/g$ and narrowly within the range of 700 to 1200 $m^2/g$. The activated carbon was obtained from Calgon Corp. and identified as type PSC. $MgCl_2$ was deposited or placed on the substrate by the novel vacuum impregnation technique described below.

Between 5 and 35 weight percent $MgCl_2$ deposited on a carbon substrate results in an effective adsorbent for removal of water from gaseous HCl, especially at water concentration in the HCl from 1 to 500 ppm by volume. Preferably the water is reduced to 0.1 ppm by volume or less. The preferred composition of the present invention for HCl drying over $MgCl_2$/carbon shows the highest water capacity compared with two other materials in prior art and being stable in HCl. Preferably, the weight percent of $MgCl_2$ is approximately 10–20.

The materials should be activated at between 270° C. (518° F.) and 400° C. (752° F.).

Figure 3:
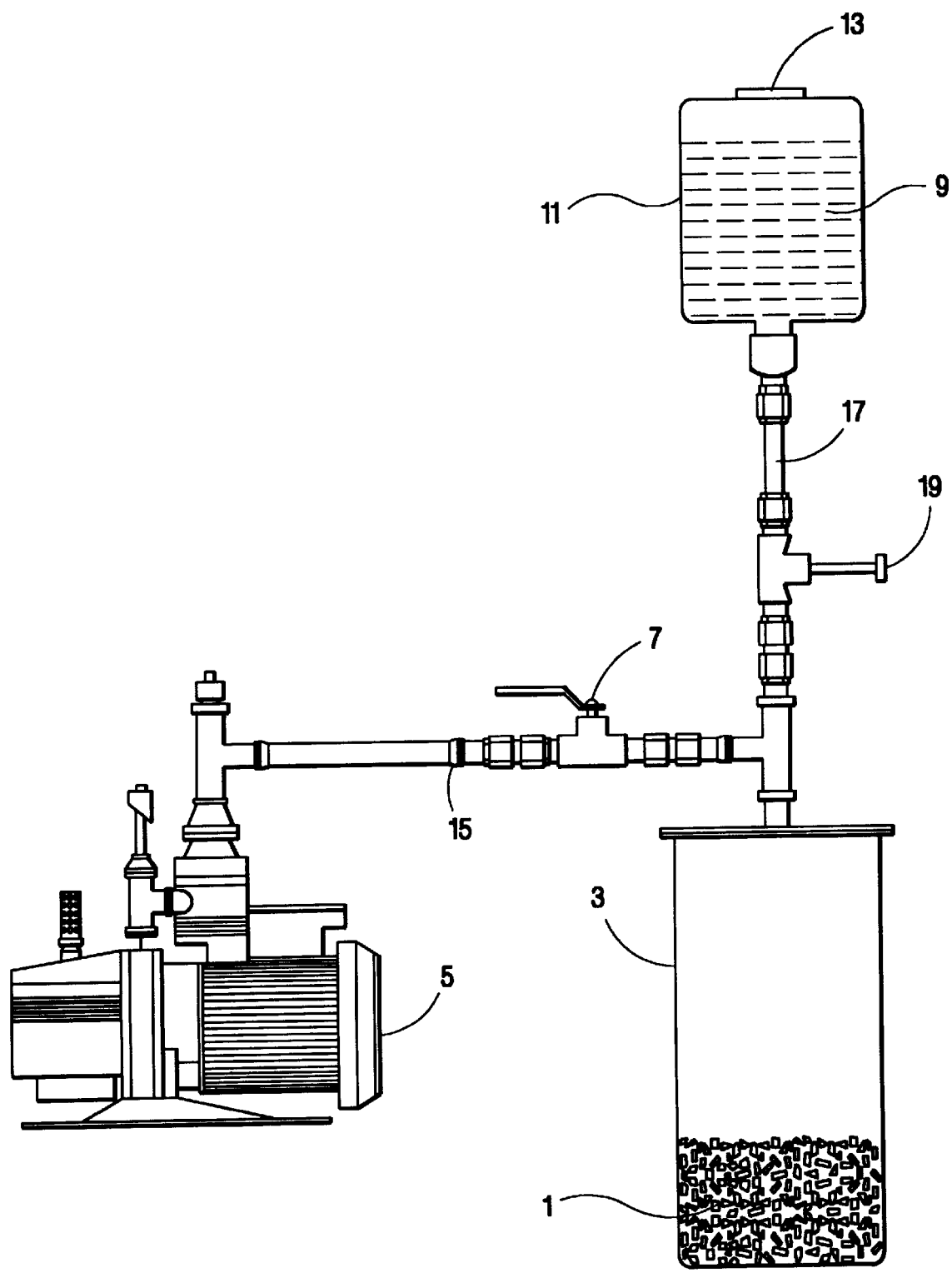
FIG. 3 is a schematic illustration of a preferred embodiment of an apparatus for synthesis of the adsorbent of the present invention.

Previously, the present inventors used atmospheric incipient wetness to impregnate the $MgCl_2$ on the activated carbon support. However, the present inventors have unexpectedly found that a vacuum impregnation provides more significant results. The reason that vacuum impregnation is so effective is that the vacuum treatment of the substrate before and during impregnation removes air initially entrapped in the pores of the substrate, while also creating a large driving force or pressure differential during the actual impregnation. This is particularly true when the activated carbon is preheated to drive off moisture and any other volatiles, and the vacuum impregnated activated carbon is dried at moderate heat prior to activation, again to drive off the carrier or solvent for the $MgCl_2$. Moderate temperature drying after vacuum impregnation is important for maintaining uniform distribution of the impregnant in the pores of the substrate. Open channels inside the pores of the impregnated substrate must be created before heating to fully dry or activate, otherwise volatile bubbles generated inside the liquid filled pores will squeeze out the deposited material. Therefore, in a preferred method it is advantageous to dry for a period of time at near ambient temperature before further drying at elevated temperature of approximately 120° C. and prior to the higher temperature activation. With regard to FIG. 3, the vacuum impregnation technique to deposit a salt on a porous substrate is practiced by loading the porous substrate material 1 into a vacuum chamber 3 where a vacuum pressure, lower than $10^{-3}$ torr, is applied by vacuum pump 5 through open valve 7, and the salt to be deposited is dissolved into distilled water 9 and stored in a solution tank 11 open 13 to ambient. When the pressure in the vacuum chamber 3 is stabilized, the vacuum line 15 is closed by valve 7 and the line 17 connecting the tank 11 of the solution to the vacuum chamber 3 is opened by valve 19. An efficient and thorough impregnation results.

The method of removing water from gaseous hydrogen halide, preferably HCl, using the adsorbent of the present invention of magnesium halide, preferably $MgCl_2$, supported on activated carbon is enhanced using the preparation technique of the present invention. The vacuum impregnation technique is utilized to uniformly deposit magnesium halide, preferably $MgCl_2$, on the carbon surface. The achievable loading of the magnesium halide, preferably $MgCl_2$, on carbon ranges from 5 to 35% by weight and the optimum loading ranges from 10 to 20 wt %. The detailed procedure of making the adsorbent is summarized as follows:

1) Predrying 6 lbs PSC carbon at 120° C. in air for 12 hours or longer;
2) Loading the predried carbon in the vacuum chamber of the impregnation unit;
3) Applying a vacuum in the vacuum chamber to reach a pressure level lower than $10^{-3}$ torr;
4) Making a $MgCl_2$ solution by dissolving an amount of $MgCl_2$ powders into 10 liters of distilled water. The amount of $MgCl_2$ for obtaining an expected loading is determined by using the following equation: weight of $MgCl_2$ (lbs)=weight of carbon (lbs)×loading÷0.26 (1—loading). The volume of the $MgCl_2$ solution needs to be sufficient to make carbon to be submerged in the solution during impregnation;
5) Impregnating the 10 liters of $MgCl_2$ solution into the vacuumized carbon;
6) Drying the impregnated carbon at room temperature in air until the carbon particles are no longer agglomerate any more;
7) Gradually increasing the temperature to 120° C. and drying at 120° C. for 12 hours;
8) Activate the adsorbent by heating at a temperature between 270 to 400° C.

Using the above technique the present invention will be illustrated with the following example.

EXAMPLE 1

The vacuum impregnation technique was used to deposit $MgCl_2$ on activated carbon for removing moisture from gaseous HCl. The impregnation process used the following procedure, 2000 grams $MgCl_2$ was dissolved into 10 liters of distilled water and stored in the solution tank of the impregnation unit. 6 lbs of predried PSC carbon was loaded in the vacuum chamber of the impregnation unit and a vacuum was applied. When the pressure in the vacuum chamber was stabilized, the pressure level on the vacuum line reached $10^{-8}$ torr. Then an impregnation of the $MgCl_2$ solution into the vacuumized PSC carbon was allowed at room temperature by closing the vacuum line and opening the valve connecting the tank of $MgCl_2$ solution to the vacuum chamber. The impregnated carbon was dried in air at room temperature for about seven days and then transferred into an oven to further remove the residual water in air at 120° C. for about 12 hours. Such processed adsorbent contains about 16 wt % $MgCl_2$.

A similar material was also synthesized by the incipient wetness technique. For about the same loading of $MgCl_2$ on carbon, the adsorbent produced by the incipient wetness technique has a poor and inconsistent water adsorption capacity measured in pure water vapor, however, by using the vacuum impregnation technique, the adsorption capacity of the getter material is significantly enhanced, especially at the very low water pressure range. This is illustrated in FIG. 1. The vacuum impregnation of the present invention was superior for all levels of water partial pressure over two separate samples of material synthesized by incipient wetness. Therefore, this new technique is proved to be superior to the traditionally used incipient wetness technique.

Figure 2:
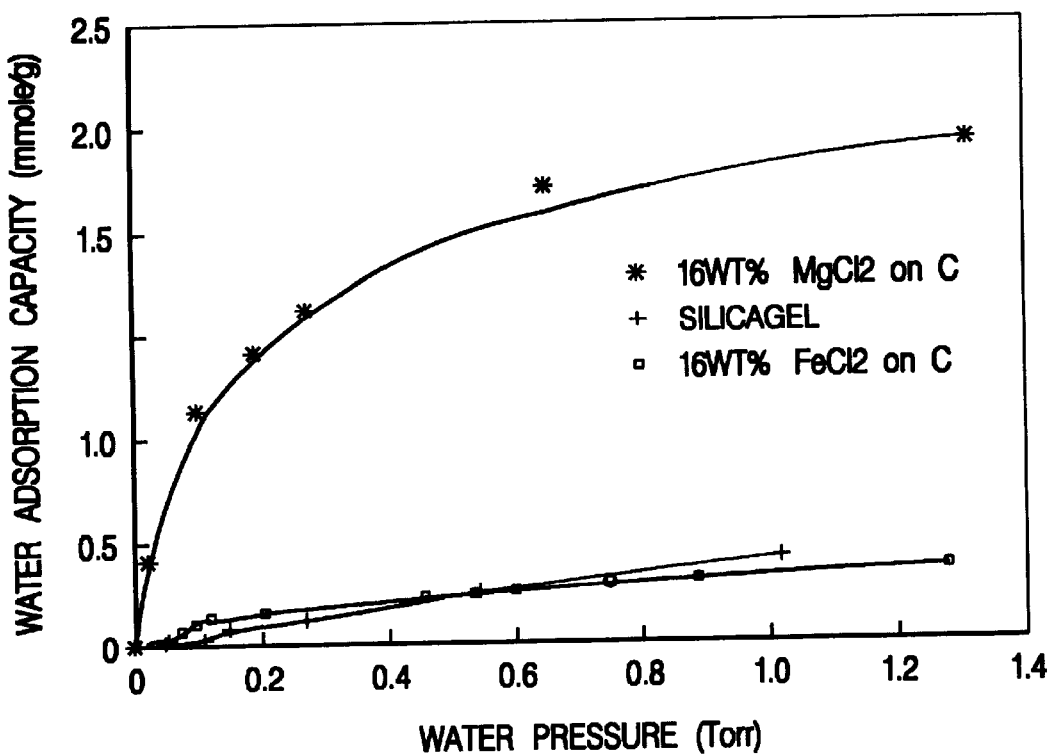
FIG. 2 is a plot of water capacity against water pressure for several adsorbent compositions, including; magnesium chloride on carbon, iron chloride on carbon and silica gel.

To compare the present invented adsorbent with two other materials in prior art and being stable in HCl, the water adsorption isotherms of the three materials with the following compositions were measured in pure water vapor; (i) 16 wt % $MgCl_2$ on carbon, (ii) silica gel bought from Ultra Pure, and (iii) 16 wt % $FeCl_2$ on carbon processed by the same technique as that used for the present invention adsorbent. As shown in FIG. 2, the adsorbent of the present invention has a significantly higher water adsorption capacity than the other two materials.

The present invention can be practiced in an apparatus for drying a gaseous hydrogen halide such as, HF, HCl, HBr, and HI. The purification of water from a hydrogen halide takes place by contacting a flow of the gas to be purified with the novel adsorbent packed in a purifier. The purifier body may be made in various shapes. The preferred shape is the cylindrical shape. The purifier should contain a gas inlet and outlet on the two opposite ends of the main body and a filling port of the adsorbent on the side of the purifier. The gas inlet and outlet are preferably provided with standard connections of the VCR to connect the gas lines upstream and downstream from the purifier. The filling port is also preferred to be standard VCR connection. Two filter disks (or frits) with 20 micron pore size are welded inside the purifier vessel near the inlet and outlet ends to prevent traces of adsorbent being carried away by the flow of the gas and contaminating the upstream and downstream piping. The material of the purifier can be 316L SS or Hastelloy. The inner surfaces of the purifier body, which come in contact with the gas, are preferably electro-finished to obtain a surface roughness less than 25 micro inches.

The purifier can be installed by purging an inert gas with a moisture concentration less than 100 ppb through both gas lines upstream and downstream from the purifier. Then the inlet VCR of the purifier is connected. After the inlet connection is made, the outlet is connected. The installed purifier is purged with the inert gas from inlet to outlet for 10 minutes. The purifier is then cycled purged twenty times with the hydrogen halide to be purified. At the end of cycle purging, the purifier is flowed with the gas to be purified for two hours. The purifier is now ready to deliver purified product.

The present invention can be used in the typical electronics fabrication industry context where bulk HCl would be delivered to the "fab" using the new purification and delivery process for gaseous hydrogen halides. The hydrogen halides include HF, HCl, HBr, and HCl, as set forth earlier. An example for purification and delivery of gaseous HCl can be considered. The process is applicable to a tube trailer or on-site storage containing HCl, a means for connecting the tube trailer outlet manifold to a bulk HCl purifier, a bulk purifier mounted preferably in the vicinity of the tube trailer or storage; a means of connecting the bulk purifier outlet to the in-house HCl delivery/distribution system of the "fab", and point of use (POU) purifiers accessible to the semiconductor manufacturing tools. Both the bulk and POU purifiers can be packed with the adsorbent of the present invention to remove water from the high purity HCl to insure its anhydrous condition and to avoid the expensive results of equipment degradation by corrosion by HCl if water were allowed to be present.

The combination of the results of the examples set forth here and the comparative data presented in FIG. 1 and FIG. 2 demonstrates unequivocally that the present invention using vacuum impregnation for magnesium halide, preferably $MgCl_2$, on activated carbon shows a significant and unexpected advantage in performance under rigorous and demanding conditions, while representing the most stable adsorbent material for making anhydrous hydrogen halides, such as HCl, at extremely high purity as required by the demanding requirements of the electronics fabrication industry.

Having thus described our invention what is desired to be secured by letters of patent of the United States includes all modifications within the spirit and scope of the appended claims.

What is claimed is:

1. A method of removing water from gaseous hydrogen halide, selected from the group consisting of HCl, HF, HBr, HI and mixtures thereof, wherein the water contained in said hydrogen halide is between 1 to 500 ppm by volume, by passing a hydrogen halide stream containing water over an adsorbent comprising between 5 to 35% by weight magnesium halide, wherein the halide is the halide of the gaseous hydrogen halide, supported on an activated carbon substrate prepared by the steps comprising:

subjecting an activated carbon substrate to vacuum conditions;

depositing from 5 to 35% by weight magnesium halide on said activated carbon substrate under said vacuum conditions to create said adsorbent;

drying said magnesium halide supported on activated carbon; and activating said adsorbent by heating to a temperature of from 270° C. (518° F.) to 400° C. (752° F.).

2. A method according to claim 1 wherein said hydrogen halide is HCl.

3. A method according to claim 2 wherein said magnesium halide is $MgCl_2$.

4. A method according to claim 3 wherein 10–20% by weight $MgCl_2$ is present on said activated carbon.

5. A method according to claim 1 including the step of drying said activated carbon substrate prior to depositing said magnesium halide.

6. A method according to claim 1 wherein said vacuum is at least $10^3$ torr.

7. A method according to claim 1 wherein said substrate has a surface area of 300 to 2500 $m^2/g$.

8. A method according to claim 1 wherein the water contained in said hydrogen halide after contact with said adsorbent is no greater than 0.1 ppm by volume.

9. A method of removing water from gaseous hydrogen halide, selected from the group consisting of HCl, HF, HBr, HI and mixtures thereof, which is delivered to a user in a bulk container, wherein the water contained in said hydrogen halide is between 1 to 500 ppm by volume, by passing a hydrogen halide stream containing water from said bulk container over an adsorbent comprising between 5 to 35% by weight magnesium halide in a purifier device and delivering the dried hydrogen halide from said purifier device to one or more user distribution systems, wherein the halide is the halide of the gaseous hydrogen halide, supported on an activated carbon substrate prepared by the steps comprising:

subjecting an activated carbon substrate to vacuum conditions;

depositing from 5 to 35% by weight magnesium halide on said activated carbon substrate under said vacuum conditions to create said adsorbent;

drying said magnesium halide supported on activated carbon; and activating said adsorbent by heating to a temperature of from 270° C. (518° F.) to 400° C. (752° F.).

10. An adsorbent for removal of moisture from gaseous HCl comprising $MgCl_2$ on an activated carbon substrate wherein said $MgCl_2$ is impregnated on said activated carbon substrate by providing said activated carbon substrate under vacuum conditions and contacting said activated carbon substrate with a solution of $MgCl_2$.

11. An adsorbent according to claim 10 wherein 5–35% by weight $MgCl_2$ is deposited on said activated carbon substrate.

12. An adsorbent according to claim 10 wherein 10–20% by weight $MgCl_2$ is deposited on said activated carbon substrate.

13. An adsorbent according to claim 10 wherein said vacuum is at least $10^{-3}$ torr.

14. An adsorbent according to claim 10 wherein said substrate has a surface area of 300 to 2500 $m^2/g$.

15. A method of preparing an adsorbent for removal of an adsorbable component from gaseous mixture containing said component, comprising the steps of:

subjecting a porous substrate to vacuum conditions;

depositing a metal salt on said porous substrate under said vacuum conditions to create said adsorbent;

drying said metal salt supported on said porous substrate; and activating said adsorbent by heating to a temperature of from 270° C. (518° F.) to 400° C. (752° F.).

16. A method according to claim 15 including depositing 10–20% by weight magnesium halide as said metal salt on activated carbon as said porous substrate.

17. A method according to claim 16 wherein the activated carbon substrate is dried by heating before depositing said magnesium halide.

18. A method according to claim 15 wherein said substrate has a surface area of 300 to 2500 $m^2/g$.

19. A method according to claim 15 wherein the activation is carried out under vacuum of at least $10^{-3}$ torr.

* * * * *